United States Patent [19]
Dewitz

[11] Patent Number: 5,869,008
[45] Date of Patent: Feb. 9, 1999

[54] APPARATUS AND METHOD FOR THE SEPARATION AND STRIPPING OF FLUID CATALYST CRACKING PARTICLES FROM GASEOUS HYDROCARBONS

[75] Inventor: Thomas Shaun Dewitz, Houston, Tex.

[73] Assignee: Shell Oil Company, Houston, Tex.

[21] Appl. No.: 646,607

[22] Filed: May 8, 1996

[51] Int. Cl.$^6$ ...................................................... B01J 8/18
[52] U.S. Cl. ........................... 422/144; 208/161; 422/139; 422/142; 422/145; 422/147
[58] Field of Search ..................... 422/139, 142, 422/144, 145, 147; 208/161

[56] References Cited

U.S. PATENT DOCUMENTS

| | | | |
|---|---|---|---|
| 4,455,220 | 6/1984 | Parker et al. | 208/161 |
| 4,664,888 | 5/1987 | Castagnos, Jr. | 422/147 |
| 4,666,675 | 5/1987 | Parker et al. | 422/147 |
| 4,692,235 | 9/1987 | Parker et al. | 208/113 |
| 4,692,311 | 9/1987 | Parker et al. | 422/144 |
| 4,693,808 | 9/1987 | Dewitz | 208/113 |
| 4,731,228 | 3/1988 | Dewitz | 422/144 |
| 4,797,038 | 1/1989 | Correard . | |
| 4,797,262 | 1/1989 | Dewitz | 422/142 |
| 4,895,636 | 1/1990 | Chen | 208/113 |
| 4,961,863 | 10/1990 | Van Den Akker et al. | 210/788 |
| 5,158,669 | 10/1992 | Cetinkaya | 208/113 |
| 5,248,408 | 9/1993 | Owen . | |
| 5,259,855 | 11/1993 | Ross et al. | 55/349 |

FOREIGN PATENT DOCUMENTS

| | | |
|---|---|---|
| 0103713 | 3/1984 | European Pat. Off. . |
| 0139390 | 2/1985 | European Pat. Off. . |
| 0593827 B1 | 4/1996 | European Pat. Off. . |
| 2159442 | 4/1985 | United Kingdom . |
| 2208298 | 3/1989 | United Kingdom . |

OTHER PUBLICATIONS

Patent Search Report of 04 Sep. 1997.
"Chemical Engineer's Handbook, Fifth Edition," Perry & Chilton, McGraw–Hill Book Company, 1973, pp. 20–81 to 20–82.

*Primary Examiner*—Timothy McMahon
*Attorney, Agent, or Firm*—Beverlee G. Steinberg

[57] ABSTRACT

There is provided an apparatus which separates and strips catalyst particles suspended in gaseous hydrocarbons after the suspension of gaseous hydrocarbons and catalyst particles have traversed a gas/solids conduit means. A substantially can-shaped open-ended cyclone is placed in a disengager shell such that an inlet of the open-ended cyclone is in communication with the gas/solids conduit means. The disengager shell has a zone for containing a fluidized catalyst and the open end of the open-ended cyclone projects into the zone. A hollow closed cyclone may be placed in communication with the open-ended cyclone via an exhaust conduit means.

23 Claims, 3 Drawing Sheets

APPARATUS AND METHOD FOR THE SEPARATION AND STRIPPING OF FLUID CATALYST CRACKING PARTICLES FROM GASEOUS HYDROCARBONS

FIELD OF THE INVENTION

This invention relates to an apparatus for the separation of solid particles from gaseous hydrocarbons and stripping of hydrocarbons from the separated particulate. In one aspect, it relates to a novel separator/stripper. In another aspect, it relates to a separator/stripper retrofit of an existing separator. In yet another aspect, it relates to an improved method for separating solid particles, such as catalyst, from gaseous hydrocarbons and stripping hydrocarbons from the separated particles.

BACKGROUND OF THE INVENTION

Apparatus for separating solid particles from gaseous hydrocarbons have been available for years and have found commercial use, for instance in the separation of hydrocarbon cracking catalysts from gaseous products. As new, highly reactive cracking catalysts, such as zeolites, came into common usage, new separation apparatus were developed to rapidly separate the reactive cracking catalyst from the cracked hydrocarbon vapor in order to avoid overcracking once the hydrocarbons exit a reactor.

Van Den Akker et al, U.S. Pat. No. 4,961,863, and Ross, Jr. et al, U.S. Pat. No. 5,259,855 describe twin-drum separators which may be located at the terminal end of a catalytic cracking riser reactor. An advantage to twin drum separators is that they don't easily choke from catalyst carryover, but they have lower separation efficiency than some other available separators. Most catalytic cracking processes require a high separation efficiency in order to reduce the catalyst carried outside of the reactor vessels and, because of the lower separation efficiency of twin drum separators, these processes cannot use twin drum separators alone. The twin drum separators also do not integrate well with internal stripper beds because the upflow of vapor from the stripper catalyst bed disrupts the vertical flow within the twin drum separator.

Dewitz, U.S. Pat. No. 4,693,808, and Dewitz et al, U.S. Pat. No. 4,731,228 describe horizontal cyclone separators. The mass ratio of catalyst to gas in a horizontal separator limits the maximum amount of catalyst the separator can carry. If the mass ratio of catalyst to gas is too high, the horizontal cyclone separator tends to choke.

Parker et al, U.S. Pat. No. 4,692,311, describe a "quick disengaging cyclone" to reduce separating and stripping time. The cyclone works on centrifugal separation and a reverse flow vortex of vapor. A "vortex stabilizer means" is used to terminate the vortex before it reaches the bottom of the cyclone, where, if not terminated, the vortex can pick-up separated catalyst at the bottom of the cyclone and carry the catalyst back up and out through the cyclone outlet. The quick disengaging cyclone has proven to work at high efficiency; however, the unit is fairly large due to the need for an internal catalyst stripping bed and a standpipe extending from the bottom of the cyclone.

Fluidized catalytic crackers, fluid cokers, entrained coal gasifiers, and other industrial processes using fast-fluidized solids, may be retrofitted to achieve higher separation and stripping efficiencies in order to meet environmental and economic needs. While separator designs such as those just described have been used for retrofitting various fast-fluidized processes, their use can be limiting for retrofitting units which have limited space for placement of separators and strippers and/or which need to be retrofitted in order to increase efficiency.

In many catalytic cracking plants, for example, a riser reactor exhausts into a disengager vessel where undesirable post-riser cracking takes place. Most of these disengager vessels have a fluidized catalyst bed in the bottom and some sort of separation means at the top. These disengager vessels are often too small to be retrofitted internally with a separator/stripper such those just described. Moreover, it is expensive and inefficient to disassemble working catalytic crackers in order to install improved separators. So it has not always been possible, or desirable, to place higher-efficiency separators and strippers, such as those just described, into existing disengager vessels. It is very desirable to provide a separator/stripper technology which has high efficiency, smaller size, and simpler design.

OBJECTS OF THE INVENTION

It is an object of this invention to provide a separator/stripper which has a high separation efficiency.

It is another object of this invention to provide a retrofit separator/stripper which can fit into existing catalytic cracker disengager vessels.

It is yet another object of this invention to provide a retrofit separator/stripper which is less expensive to manufacture.

SUMMARY OF THE INVENTION

The present invention provides an apparatus which separates suspensions of vapors and solid particles, such as catalyst, ash or coke, and strips adsorbed and entrained residues, such as hydrocarbons, from the separated particles. In one embodiment, a substantially can-shaped open-ended cyclone having a substantially closed end, an open end, a wall connecting a perimeter of the closed end and the open end, an inside surface, at least one inlet, and an outlet positioned in the substantially closed end is contained in a disengager shell. A suspension of cracked vapors and solid particles enter the open-ended cyclone through the at least one inlet. The outlet of the open-ended cyclone is connected to an exhaust conduit means for providing a gas flow pathway from the outlet of the open-ended cyclone. The disengager shell has a zone adapted to contain fluidized particulate solids and the open end of the open-ended cyclone projects downwardly into the zone.

In another embodiment of the invention there is provided a multi-stage close-coupled disengager/stripper for retrofit of a disengager having a zone for containing fluidized solid particles. A substantially can-shaped open-ended cyclone is contained inside the existing disengager. The open-ended cyclone has a substantially closed end, an open end, a wall connecting a perimeter of the closed end to the open end, at least one inlet in communication with a suspension of solid particles and vapors, and an outlet positioned in the substantially closed end. The open end of the open-ended cyclone projects downwardly into the zone for containing fluidized catalyst. A hollow substantially closed cyclone is also contained inside the existing disengager. The closed cyclone has an upper portion, a lower portion, an inlet and an outlet. The closed cyclone is placed in series with the open-ended cyclone via an exhaust conduit means for providing a gas flow pathway from the outlet of the open-ended cyclone to the inlet of the substantially closed cyclone. The exhaust conduit means provides a means for compensating for thermal and vibrational movements between the open-ended cyclone and the closed cyclone.

In yet another embodiment of the invention there is provided an improved method for separating a mixture of solid particles and vapors and for stripping adsorbed and entrained residue from the solid particles in a disengager having a fluidized bed of particulate solids. The mixture of solid particles and vapors is flowed through a conduit and passed into a substantially can-shaped open-ended cyclone contained in the disengager. The open-end of the open-ended cyclone is positioned to be submerged in the fluidized bed during operation. The level of the fluidized bed is controlled so that a top of the fluidized bed is maintained above the open end of the open-ended cyclone and a portion of the fluidized bed is contained within the open-ended cyclone at the open end. The mixture of solid particles and vapors is separated substantially into vapors and solid particles containing adsorbed and/or entrained residue, and the separated solids are allowed to settle into the portion of the fluidized bed contained within the open-ended cyclone. Stripping gas is introduced to strip the residue from the separated solids, forming stripped vapors and stripped solid particles. The vapor and stripped vapor are passed downstream of the open-ended cyclone. The stripped solid particles are allowed to fluidize out of and away from the open end of the open-ended cyclone and into the fluidized bed.

In still yet another embodiment of the invention, there is provided a method for retrofitting a disengager having a zone to contain fluidized solid particles for separating suspensions of solid particles and vapors and for stripping adsorbed and entrained residue from the solid particles. A substantially can-shaped open-ended cyclone is installed in the disengager and connected to a means for introducing the flow of the mixture of solid particles and vapors. The open end of the open-ended cyclone projects downwardly into the zone for containing fluidized catalyst.

In yet another embodiment of the invention, there is provided a method for sealing an open-ended cyclone in a fluidized bed of solid particles. The method comprises submerging an open end of the open-ended cyclone into the primary fluidized bed. A gas/solids conduit means may be attached to an inlet of the open-ended cyclone. The level of the primary fluidized bed is controlled such that a top surface of the fluidized bed is maintained above the open end of the open-ended cyclone and a portion of the primary fluidized bed is contained within the open-ended cyclone, forming a secondary fluidized bed.

DETAILED DESCRIPTION

In a process which uses particulate solids, it is common for suspensions and other mixtures of fine particles to be entrained in a gaseous stream. Many times, the suspensions contain fine solid particles which contain adsorbed and/or entrained residue of the substance(s) involved in the reaction. It becomes necessary to both separate and recover the fine particles from the gaseous stream and to strip the residue from the fine particles in order to prevent possibly detrimental or undesirous reactions downstream. For example, in a typical catalytic cracking process, hydrocarbons are reacted in the presence of catalyst in a riser reactor. Hydrocarbon gases are formed which carry fine particulates of the catalyst along as the gases flow downstream of the reactor. The suspended catalytic particles contained adsorbed and/or entrained hydrocarbons. The catalytic particles must be separated from the gases and stripped of the hydrocarbons to prevent catalytic reactions in zones where this is undesirable (commonly called "overcracking"). Stripping also increases yield and allows the catalyst to be recycled. While the apparatus and process of the present invention will be described with particular emphasis on catalytic cracking of hydrocarbons, it is to be understood that it is not so limited and that the apparatus and processes will function as well for other systems which use particulate solids and generate mixtures of the particulate solids in vapor flow.

Figure 1:
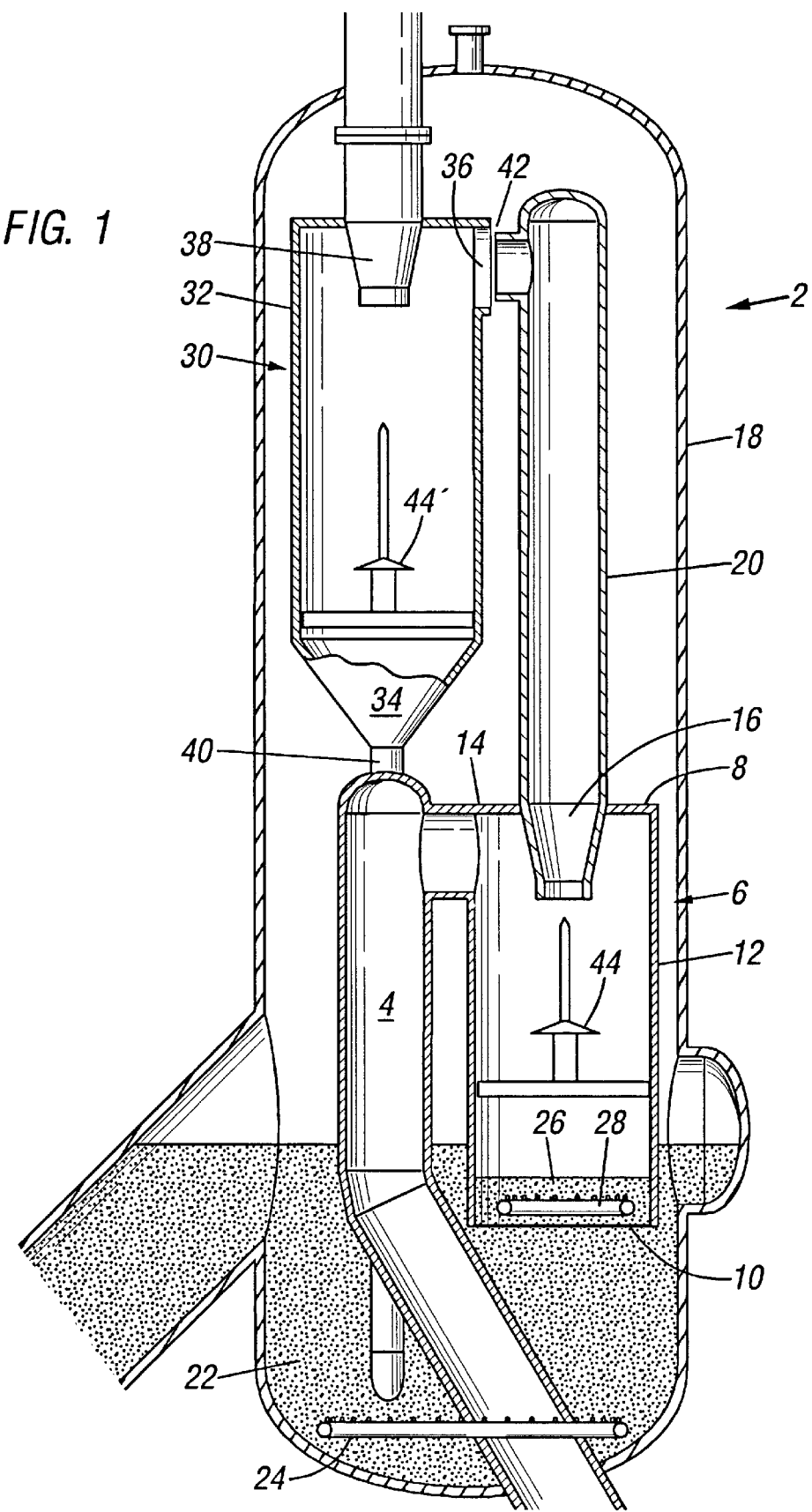
FIG. 1 shows a lay-out of a multi-stage disengager/stripper according to the present invention with open-ended and closed cyclones present.
Figure 2:
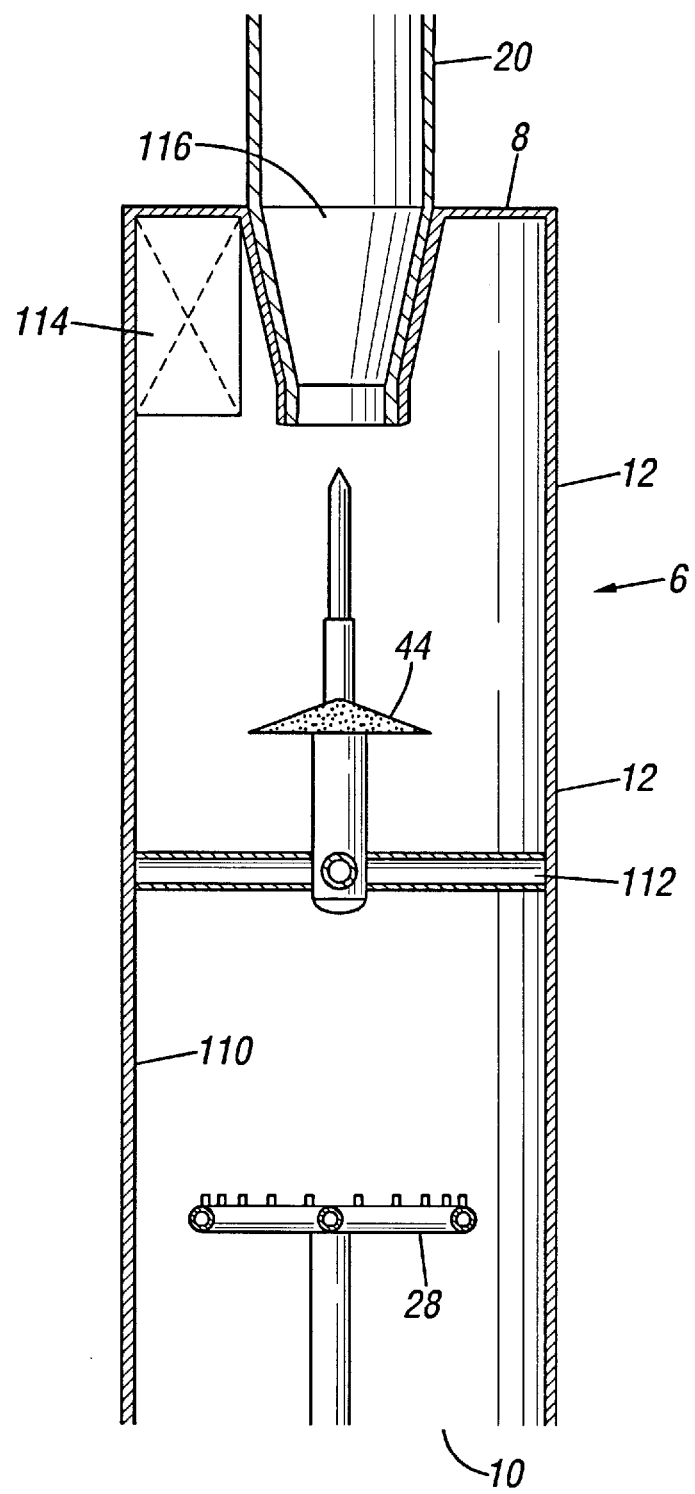
FIG. 2 shows a open-ended cyclone as utilized in the present invention, including vortex stabilizer means.

Referring to FIG. 1 and FIG. 2, in a first embodiment of the invention there is provided a disengager/stripper 2 for separating solid particles, such as catalyst, suspended in vapors, such as gaseous hydrocarbons, and for stripping adsorbed and/or entrained residue, such as hydrocarbons, from the particles. A substantially can-shaped open-ended cyclone 6 having a substantially closed end 8, an open end 10, a wall 12 connecting a perimeter of the closed end and the open end, an inside surface 110, at least one inlet 14 for receiving the suspension of particles and vapors, and an outlet 16 positioned in the substantially closed end is contained in a disengager shell 18. In the embodiment shown in the FIG. 1, the inlet 14 is in communication with a gas/solids conduit means 4 which is carrying the suspension of vapor and solid particles. The inlet 14 may optionally be a tangential inlet means which forms a swirl zone in the cyclone, causing mixtures of solid particles and vapor to form a vortex. The open-ended cyclone is preferably lined with a refractory which is resistant to erosion, such as ceramic. The outlet 16 of the open-ended cyclone 6 is connected to an exhaust conduit means 20 for providing a flow path from the outlet of the open-ended cyclone. The disengager shell 18 has a zone adapted to contain fluidized solid particles 22 in the inside bottom and a means 24 for injecting a gas, such as steam, for fluidizing and/or stripping solid particles. The open end 10 of the open-ended cyclone 6 projects downwardly into this zone. During operation of the disengager/stripper, the zone is filled with solid particles and the solid particles are fluidized, forming a primary fluidized bed and resulting in the open end of the open-ended cyclone becoming submerged in the fluidized solid particles 22. The fluidized solid particles 22 are thus also partially contained inside the open-ended cyclone 6, forming a secondary fluidized bed 26. Consequently, the secondary fluidized bed 26 acts as a quick-stripper fluidized stripper bed inside the open-ended cyclone 6 while the primary fluidized bed acts as a main stripper fluidized stripper bed in the disengager shell 18. Preferably, during operation, the level of the internal, quick-stripper fluidized bed is lower than the level of the main stripper fluidized bed as the open-ended cyclone is preferably operated at a higher pressure than the disengager.

Solid particles are fluidized away from the open end of the open-ended cyclone and distributed in the main stripper fluidized stripper bed in the disengager shell. The open-ended cyclone may optionally be provided with a separate means for injecting stripping gas 28 into the fluidized solid particles. The disengager/stripper is provided with a means for withdrawing solid particles, not numbered in the figures.

Figure 3:
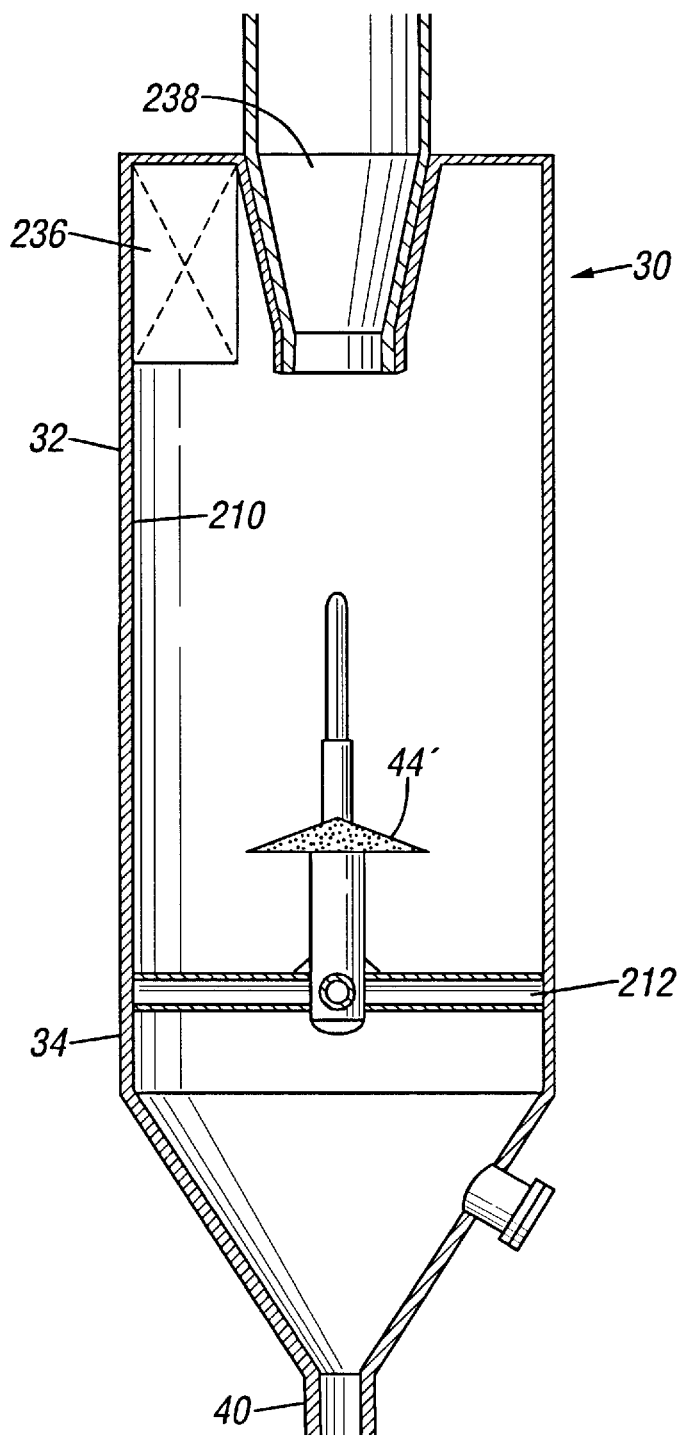
FIG. 3 shows a closed cyclone, including vortex stabilizer means.

Referring to FIG. 1 and FIG. 3, in a preferred embodiment, the disengager shell 6 also contains a hollow substantially closed cyclone 30. The closed cyclone 30 has an upper portion 32, a lower portion 34, an inside surface 210, an inlet 36, and an outlet 38. The inlet may optionally be a tangential inlet means which forms a swirl zone in the cyclone. The swirl zone causes suspensions of solid particles and vapors to form a vortex. The closed cyclone 30 is preferably provided with a dip leg 40. The dip leg 40, which is preferably valved at the bottom to allow release of separated particles, extends into the main stripper fluidized stripper bed 22. The substantially closed cyclone is preferably lined with a refractory or ceramic material. Cyclones such as the closed cyclone herein described are well known in the art. The closed cyclone 30 is placed in series with the open-ended cyclone 6 via the exhaust conduit means 20, which is attached to the outlet 16 of the open-ended cyclone and the inlet 36 of the closed cyclone, a process known as "close-coupling". The term "close-coupled" is commonly used in the art when the exhaust of one cyclone is coupled to the inlet of another cyclone. Close-coupling cyclones reduces the undesirable, post-riser cracking of riser reactor products which can take place when, for example, (1) all separation is performed in the disengager, or (2) the first cyclone exhausts into the disengager shell.

Referring again to FIG. 1, a venturi may optionally be positioned in the exhaust conduit means 20 in the vicinity of the second inlet 36. The venturi not only helps move the gases in the exhaust conduit means 20 into the closed cyclone 30, it also reduces the pressure differential between the disengager shell and the closed cyclone. It is preferred that the open-ended cyclone 6 operate at a slight positive pressure compared to the disengager shell 18 and that the closed cyclone 30 operate at as high a pressure as practicable though usually still negative relative to both the open-ended cyclone 6 and the disengager shell 18. The exhaust conduit means 20 provides both a gas flow pathway from the outlet 16 of the open-ended cyclone 6 to the inlet 36 of the closed cyclone 30 and a means for compensating for thermal and vibrational movements between the open-ended cyclone and the closed cyclone. Any means for compensating for thermal and vibrational movement may be used; such as placing a circumferential opening, or gap 42, in the exhaust conduit means 20, where the opening is positioned between the venturi and the second tangential inlet 36. The opening further provides a means for stripper gas and stripped vapor in the disengager shell 18 to enter the slightly lower pressure closed cyclone 30.

In a most preferred embodiment, illustrated in FIG. 1, FIG. 2, and FIG. 3, either or both the open-ended cyclone and closed cyclone are provided with vortex stabilizer means 44,44', such as those described in U.S. Pat. No. 4,692,311, incorporated herein by reference. The open-ended cyclone inlet 14 comprises at least one open-ended cyclone tangential inlet means 114 in the wall near the closed end 8 and the closed cyclone inlet 36 comprises a closed cyclone tangential inlet means 236 in the upper portion 32. The tangential inlet means each form a swirl zone in the respective cyclone. The swirl zone causes suspensions of solid particles and vapors entering through the respective tangential inlet means to form a vortex. The outlet 16 of the open-ended cyclone 6 comprises a first gaseous vortex outlet 116 and the outlet 38 of the closed cyclone 30 comprises a second gaseous vortex outlet 238. The first and the second vortex outlets each have an inside surface defining a diameter.

The open-ended cyclone 6 further comprises a first vortex stabilizer means 44. The vortex stabilizer means 44 has a perimeter and is coaxially mounted inside the open-ended cyclone 6 near a middle portion. The diameter of the vortex stabilizer means 44 is at least the diameter of the first vortex outlet 116. The vortex stabilizer means 44 is positioned a distance from the first vortex outlet 116 to define a cyclone zone, wherein solid particles are separated from vapor. The first vortex stabilizer means 44 is preferably spaced a distance equal to a distance of at least one of the first vortex outlet diameters below the first vortex outlet 116 and is supported by vortex stabilizer support means 112 such that there is an annular space intermediate to the perimeter of the first vortex stabilizer means 44 and the inside surface 110 of the open-ended cyclone 6. The first vortex stabilizer means 44 stabilizes and centers the vortex in the open-ended cyclone to reduce reentrainment of particles being separated and/or stripper bed particles into the gaseous fluid. The annular space allows separated particles to pass downward through the annular space into the quick-stripper fluidized stripper bed 26. The annular space also allows stripping gas from the stripper bed to pass upward through the annular space into the cyclone zone. The quick-stripper fluidized stripper bed 26 defines a stripping zone in gaseous communication with the cyclone zone through the annular space. In the stripping zone, adsorbed and/or entrained residue is stripped from the particles to thereby recover the residue and to reduce undesired reactions of the residue. For example, in a suspension of fine catalyst particles and hydrocarbon vapors, the hydrocarbon vapors are first separated from the catalyst particles in the cyclone zone. Then the adsorbed and entrained hydrocarbon on the catalyst is stripped from the catalyst in the stripping zone, recovering the hydrocarbon as hydrocarbon vapor and reducing undesired overcracking reactions.

When a vortex stabilizer is used, the depth to which the open end of the open-ended cyclone is submerged in the primary fluidized bed is dependent upon the elevation of the vortex stabilizer. In particular, the depth of the secondary fluidized bed (that portion of the bed inside the open-ended cyclone) should be no greater than the distance from the open end of the open-ended cyclone to the bottom of the annular space between the vortex stabilizer means and the inner surface of the open-ended cyclone. In an embodiment which uses a vortex stabilizer such as that shown in FIG. 1 and FIG. 2, the maximum depth of the secondary fluidized bed would be from the open end of the open-ended cyclone to the bottom most surface of the dish-shaped portion (the shield) of the vortex stabilizer.

The substantially closed cyclone 30 has a second vortex stabilizer means 44'. The second vortex stabilizer means 44' has a perimeter and is coaxially mounted inside the closed cyclone 30 near a middle portion. The second vortex stabilizer means 44' has a diameter of at least the diameter of the second vortex outlet 238 and is positioned a distance from the second vortex outlet 238 to define a cyclone zone. The cycle zone in the closed cyclone functions substantially as that already described for the open-ended cyclone. The second vortex stabilizer means 44' is preferably spaced a distance equal to a distance of at least one of the second vortex outlet diameters below the second vortex outlet 238. The vortex stabilizer means is further spaced between the trap 212 and the second vortex outlet 238. The second vortex stabilizer means 44' is supported by vortex stabilizer support means 212 to provide an annular space intermediate to the perimeter of the second vortex stabilizer means 44' and the inside surface 210 of the closed cyclone. The annular space allows separated particles to pass downwardly and gases to pass upwardly.

When both an open-ended cyclone with vortex stabilizer means and a closed cyclone with vortex stabilizer means are used in series as described, the open-ended cyclone acts as a "quick disengaging cyclone" and the closed cyclone acts as a "high efficiency cyclone."

In another embodiment of the invention, there is provided a multi-stage close-coupled disengager/stripper for retrofit of an existing disengager 18 having a zone adapted to contain fluidized solid particles 22. Particularly, the multi-stage close-coupled disengager/stripper will work well as a retrofit for fluid catalytic crackers, fluid cokers, entrained coal gasifiers, and other industrial processes with small disengagers and/or internal cyclones. The multi-stage close-coupled disengager/stripper comprises a substantially can-shaped open-ended cyclone 6 contained inside the disengager 18. The open-ended cyclone 6 has a substantially closed end 8, an open end 10, a wall 12 connecting a perimeter of the closed end to the open end, at least one inlet 14 in communication with a suspension of solid particles and vapor, and an outlet 16 positioned in the closed end. A hollow substantially closed cyclone 30 is contained inside the disengager 18 and is further in series with the open-ended cyclone 6. The closed cyclone has an upper portion 32, a lower portion 34, an inlet 36 and an outlet 38. The closed cyclone is usually provided with a dip leg 40. The dip leg extends into the main stripper bed 22 and is valved at the bottom. The open-ended and closed cyclones are preferably lined with a refractory material which is also resistant to erosion, such as a ceramic. A gas/solids conduit means 4 carrying a suspension of solid particles and vapor is preferably attached to the open-ended cyclone 6 at the open-ended cyclone inlet 14. The substantially closed cyclone outlet 38 is connected to an outlet conduit means 46 for carrying stripped gas outside the disengager 18. An exhaust conduit means 20 provides a gas flow pathway from the outlet 16 of the open-ended cyclone 6 to the inlet 36 on the closed cyclone 30. The exhaust conduit means 20 further provides a means for compensating for thermal and vibrational movements 42 between the open-ended cyclone 6 and the closed cyclone 30. The open end 10 of the open-ended cyclone 6 projects downwardly into the zone for containing fluidized particles 22. As previously described, during operation the open end of the open-ended cyclone becomes submerged in the fluidized particle zone 22 and the fluidized particle zone 22, thus forming a secondary fluidized particle bed. The secondary fluidized particle bed acts as a quick-stripper fluidized particle stripper bed 26 in the open-ended cyclone 6. Although the existing disengager 18 already has a means for injecting stripping gas into the fluidized zone 24, the open-ended cyclone 6 may be provided with its own such means 28. The stripped particulate falling out the open end of the open-ended cyclone is fluidized away from the open end and distributed in the main stripper fluidized stripper bed 22 in the disengager 18. As already described, the means for compensation for thermal and vibrational movement may be any design known to function well, such as a circumferential opening 42 in the exhaust conduit means. The opening, when positioned before the second inlet 36, further provides a means for stripper gas from the disengager 18 to enter the closed cyclone 30. The disengager/stripper is provided with a means to withdraw solid particles.

In a preferred embodiment the open-ended and closed cyclones are each provided with vortex stabilizer means 44, 44', substantially as previously described. With the vortex stabilizer means, the first cyclone 6 acts as a quick disengage cyclone and the closed cyclone 30 acts as a high efficiency cyclone. The exhaust conduit means 20 may also have a venturi positioned in the exhaust conduit means in the vicinity of the second inlet 36, 236. The venturi is substantially as described above and helps the open-ended cyclone 6 operate at a slight positive pressure compared to the disengager 18 and the closed cyclone 30 operate at a slight negative pressure compared to the open-ended cyclone 6. The closed cyclone also operates at a slight negative pressure compared to the existing disengager 18.

The advantages provided by the present invention are numerous. Conventional cyclones and conventional retrofit cyclones are substantially closed, with a valve near the bottom to release separated solid particles, such as catalyst, which builds up in the bottom of the cyclone. In order to develop sufficient head to overcome the cyclone inlet and outlet pressure drop and thus allow the separated solid particles to discharge to a fluidized bed, there usually must be a dip leg, which must be quite long. Thus, the entire apparatus requires substantial space to accommodate the length. The open-ended cyclone utilized in the present invention does not require a dip leg and thus can be made to fit into a small system with limited space. Because the open-ended cyclone utilized in the present invention uses an existing fluidized bed, the cyclone can be made smaller as it does not need its own, "self-contained" fluidized bed. The open-ended cyclone utilized in the invention is also not a pressure vessel, an advantage which makes it cheaper to construct. Closed systems also experience problems during start-up when solid particle slugs flow up the gas/solids conduit means with the vapor/solid particle mixture. The excess solid particles fall into the cyclone or separator and fill it. To solve this problem, many operators do not place any solid particles into the cyclone or separator at startup. Of course, this decreases both yield and efficiency until the solid particle level is adequate to accommodate the necessary stripping step. In the present invention, any slugs formed during start-up fall into the open-ended cyclone, are fluidized away from the open end and distributed in the main stripper fluidized stripper bed in the disengager, eliminating unwanted build-up in the cyclone. Finally, the present invention allows the disengager shell to be used without a refractory liner since the open-ended and closed cyclones are lined. The liner is not needed in the disengager shell because the solid particles will not be flowing in the disengager shell in a manner which would erode the walls. Eliminating the liner in the disengager shell reduces the occurrence of two problems commonly seen. First, corrosion caused by uneven heating of the disengager shell walls should be reduced. Second, the refractory liner in the disengager shell will spall over time. The spalled liner enters the system, where it will plug valves and equipment. Eliminating the refractory liner of the disengager shell should substantially reduce this problem.

In yet another embodiment of the invention there is provided an improved method for separating a mixture of solid particles and vapors and for stripping adsorbed and entrained residue from the solid particles in a disengager having a primary fluidized bed. The stream of particles suspended in vapor is flowed through a conduit and passed into a substantially can-shaped open-ended cyclone contained in the disengager. The open-end of the open-ended cyclone is positioned to be submerged in the primary fluidized bed during operation. The level of the primary fluidized bed is controlled so that a top surface of the primary fluidized bed is maintained above the open end of the open-ended cyclone. A portion of the primary fluidized bed is also contained within the open-ended cyclone at the open end, forming a secondary fluidized bed within the open-ended cyclone. The stream of particles suspended in vapor is separated into vapor and particulate solids containing adsorbed and/or entrained residue. The separated solids flow settle into the secondary fluidized bed. Stripping gas is introduced into the open-ended cyclone to strip the adsorbed and/or entrained residue from the separated solids, forming stripped vapors and stripped particles. The vapor and stripped vapor are passed downstream of the open-ended cyclone. The stripped particulate is allowed to fluidize out and away from the open end of the open-ended cyclone and into the primary fluidized bed. In a preferred embodiment, the open-ended cyclone is operated at a slight positive pressure to the disengager, causing the level of a top surface of the secondary fluidized bed to be below the level of the top surface of the primary fluidized bed. The open-ended cyclone may optionally be provided with a vortex stabilizer, substantially as already described. As previously described, the presence of a vortex stabilizer dictates the maximum depth of the secondary fluidized bed. The open-ended cyclone may optionally be placed in series with another cyclone for increased separating and/or stripping efficiency.

In yet another embodiment of the invention, there is provided a method for retrofitting an existing disengager 18 having a zone for containing fluidized particulate solids 22 for separating mixtures of particles and vapor and for stripping adsorbed and entrained residue from the particles. The method comprises installing a substantially can-shaped open-ended cyclone 6 in the disengager 18. The open-ended cyclone is substantially as already described and has an inlet which is placed in communication with a means 4 for conveying the mixture of particles and vapor. An exhaust conduit means 20 is installed to provide a gas flow pathway from the outlet of the open-ended cyclone outlet 16. In a preferred method, there is also provided a hollow substantially closed cyclone 30, substantially as already described, which is placed in series with the open-ended cyclone 6 by connecting the closed cyclone inlet 36 to the exhaust conduit means 20. It is preferred that the open-ended cyclone be operated at a slightly greater pressure than the substantially closed cyclone. The closed cyclone outlet 38 is attached to an outlet conduit means 46 to transport clean gas outside the disengager. In a more preferred embodiment, a means for compensating for thermal and vibrational movement between the open-ended cyclone and the closed cyclone and a means for stripper gas from the disengager to enter the closed cyclone are provided. These means may be substantially as described above. The open-ended and/or closed cyclones may also optionally be provided with vortex stabilizer means 44, 44', substantially as already described.

In another embodiment of the invention, there is provided a method for sealing an open-ended cyclone in a fluidized bed of solid particles. The method comprises submersing an open end of the open-ended cyclone into a fluidized bed and connecting an inlet of the open-ended cyclone to a gas/solids conduit means. During operation the open end of the open-ended cyclone is submerged, preferably at least 6 inches, below a top surface of the fluidized bed of solid particles and a portion of the fluidized bed is contained inside the open-ended cyclone, forming a secondary fluidized bed within the open-ended cyclone. The level of the top of the secondary fluidized bed is preferably below the level of the top of the primary fluidized bed. A seal is formed at the interfaces of the fluidized beds and the open-ended cyclone. When the cyclone is provided with an outlet, vapors entering the cyclone from the gas/solids conduit means will exit the cyclone through the outlet rather than through the fluidized beds. Particulate entering the cyclone through the inlet will settle into the secondary bed and can be fluidized away.

Other embodiments of the invention will be apparent to those skilled in the art from a consideration of this specification or from practice of the invention disclosed. It is intended that the specification be considered as exemplary only, with the true scope and spirit of the invention being indicated by the following claims.

What is claimed is:

1. A disengager/stripper for separating particulate solids suspended in vapor and for stripping adsorbed and entrained residue from said particulate solids comprising:
   (a) a disengager shell having a zone adapted to contain fluidized solid particles, and a means for injecting a gas for fluidizing or stripping solid particles;
   (b) a substantially can-shaped open-ended cyclone contained inside said disengager shell, said open-ended cyclone having a substantially closed end defining an outlet, an open end, a wall connecting a perimeter of the closed end and the open end, an inside surface, and at least one inlet for receiving a suspension of solid particles and vapor; and
   (c) a first exhaust conduit means for providing a flow path from the outlet of said open-ended cyclone, said first exhaust conduit means having an end connected to the outlet of said open-ended cyclone;
   (d) wherein said open end of said open-ended cyclone projects downwardly into said zone adapted to contain fluidized solid particles.

2. The apparatus of claim 1 wherein said at least one inlet comprises at least one open-ended cyclone tangential inlet means in said wall near said closed end, each said open-ended cyclone tangential inlet means forming a swirl zone wherein suspensions of solid particles and vapors entered through said open-ended cyclone tangential inlet means form a vortex.

3. The apparatus of claim 2 wherein
   (a) said outlet comprises a first gaseous vortex outlet, said first gaseous vortex outlet having an inside surface defining a diameter;
   (b) said open-ended cyclone further comprises a first vortex stabilizer means coaxially mounted inside said open-ended cyclone near a middle portion, said first vortex stabilizer means having a perimeter, and a diameter of at least the diameter of said first gaseous vortex outlet, said first vortex stabilizer positioned a distance from said first gaseous vortex outlet to define a cyclone zone for separating solid particles from vapor, wherein said first vortex stabilizer means is spaced a distance equal to a distance of at least one of said first gaseous vortex outlet diameters below said first gaseous vortex outlet, and wherein said first vortex stabilizer means is supported by vortex stabilizer support means to provide an annular space intermediate to said perimeter of said first vortex stabilizer means and the inside surface of said open-ended cyclone; and
   (c) means for injecting a gas for fluidizing or stripping solid particles.

4. The apparatus of claim 1 further comprising:
   (a) a hollow substantially closed cyclone contained within said disengager shell and in series with said open-ended cyclone, said closed cyclone having an upper portion defining an outlet, a lower portion, an inlet, and an inside surface; and
   (b) a second exhaust conduit means for providing a flow path from the outlet of said closed cyclone;
   (c) wherein said first exhaust conduit means is connected to the inlet of said closed cyclone, said first exhaust conduit means further comprising a means for compensating for thermal and vibrational movements between said open-ended cyclone and said closed cyclone.

5. The apparatus of claim 4 wherein the inlet of said substantially closed cyclone comprises a closed cyclone tangential inlet means in said upper portion, said closed cyclone tangential inlet means forming a swirl zone wherein suspensions of solid particles and vapor entered through said closed cyclone tangential inlet means form a vortex.

6. The apparatus of claim 5 wherein:
(a) said outlet of said closed cyclone comprises a second gaseous vortex outlet, said second gaseous vortex outlet having an inside surface defining a diameter; and
(b) said closed cyclone further comprises a second vortex stabilizer means coaxially mounted inside said closed cyclone near a middle portion, said second vortex stabilizer means having a perimeter, and a diameter of at least the diameter of said second vortex outlet, said second vortex stabilizer means positioned a distance from said second vortex outlet to define a cyclone zone to separate solid particles from vapor, wherein said second vortex stabilizer means is spaced a distance equal to a distance of at least one of said second vortex outlet diameters below said second vortex outlet and wherein said second vortex stabilizer means is supported by vortex stabilizer support means to provide an annular space intermediate to said perimeter of said second vortex stabilizer means and the inside surface of said closed cyclone.

7. The apparatus of claim 4 further comprising a venturi positioned in said exhaust conduit means in the vicinity of said second tangential inlet.

8. The apparatus of claim 7 wherein the means for compensating for thermal movement comprises a circumferential opening in said exhaust conduit means, said opening positioned between said venturi and said second tangential inlet, said opening further allowing stripper gas and stripped vapor in said disengager shell to enter said closed cyclone.

9. A multi-stage close-coupled disengager/stripper for retrofit of a disengager having a zone adapted to contain fluidized solid particles, comprising:
(a) a substantially can-shaped open-ended cyclone contained inside said disengager and having a substantially closed end defining an outlet, an open end, a wall connecting a perimeter of said closed end to said open end, an inside surface, and at least one inlet in communication with a suspension of solid particles and vapors;
(b) a hollow substantially closed cyclone having an upper portion defining an outlet, a lower portion, an inside surface, and an inlet; and
(c) a first exhaust conduit means for providing a flow path from the outlet of said open-ended cyclone to the inlet of said closed cyclone, said first exhaust conduit means further comprising a means for compensating for thermal and vibrational movements between said open-ended cyclone and said closed cyclone;
(d) wherein said open end of said open-ended cyclone projects downwardly into said zone adapted to contain fluidized solid particles.

10. The apparatus of claim 9 wherein
(a) said at least one inlet in said open-ended cyclone comprises at least one open-ended cyclone tangential inlet means in said wall portion near said closed end to form a swirl zone wherein suspensions of solid particles and vapor entered through said inlet means form a vortex; and
(b) said inlet of said substantially closed cyclone comprises a closed cyclone tangential inlet means in said upper portion to form a swirl zone wherein suspensions of solid particles and vapor entered through said second inlet means form a vortex.

11. The apparatus of claim 10 wherein
(a) said outlet of said open-ended cyclone comprises a first gaseous vortex outlet in said closed end of said open-ended cyclone, said first gaseous vortex outlet having an inside surface defining a diameter;
(b) said open-ended cyclone further comprises
(i) a first vortex stabilizer means coaxially mounted near an inside middle portion of said open-ended cyclone, said first vortex stabilizer means having a perimeter, and a diameter of at least the diameter of said first gaseous vortex outlet, said first vortex stabilizer means positioned a distance from said first gaseous vortex outlet to define a cyclone zone to separate solid particles from vapor, wherein said first vortex stabilizer means is spaced a distance equal to a distance of at least one of said first gaseous vortex outlet diameters below said first gaseous vortex outlet and wherein said first vortex stabilizer means is supported by vortex stabilizer support means to provide an annular space intermediate to said perimeter of said first vortex stabilizer means and the inside surface of said open-ended cyclone, and
(ii) means for injecting a gas for fluidizing or stripping solid particles; and
(c) said outlet of said closed cyclone comprises a second gaseous vortex outlet, said second gaseous vortex outlet having an inside surface defining a diameter, and
(d) said closed cyclone further comprises a second vortex stabilizer means coaxially mounted inside said closed cyclone, said second vortex stabilizer means having a perimeter, and a diameter of at least the diameter of said second gaseous vortex outlet, said second vortex stabilizer positioned a distance from said second gaseous vortex outlet to define a cyclone zone to separate solid particles from vapor, wherein said second vortex stabilizer means is spaced a distance equal to a distance of at least one of said second vortex outlet diameters below said second vortex outlet and wherein said second vortex stabilizer means is supported by vortex stabilizer support means to provide an annular space intermediate to said perimeter of said second vortex stabilizer means and the inside surface of said closed cyclone.

12. The apparatus of claim 11 wherein a gas/solids conduit means is attached to said open-ended cyclone at said first tangential inlet and said second gaseous vortex outlet is connected to an outlet conduit means for carrying stripped and unstripped vapors outside said disengager.

13. The apparatus of claim 10 further comprising a venturi positioned in said exhaust conduit means in the vicinity of said second tangential inlet.

14. The apparatus of claim 9 wherein the means for compensating for thermal and vibrational movement comprises a circumferential opening in said exhaust conduit means, said opening positioned between said venturi and said second tangential inlet, said opening further allowing stripper steam and stripped hydrocarbons from said disengager to enter said closed cyclone.

15. In a method for separating a mixture of solid particles and vapors and for stripping adsorbed and entrained residue from separated solid particles in a disengager having a primary fluidized bed, the improvement comprising:

(a) flowing a mixture of solid particles and vapor through a gas/solids conduit means;

(b) passing the mixture of solid particles and vapor into a substantially can-shaped open-ended cyclone contained in said disengager, wherein an open end of said open-ended cyclone is submerged in said primary fluidized bed;

(c) controlling a level of said primary fluidized bed wherein a top surface of said primary fluidized bed is maintained above the open end of said open-ended cyclone, and wherein a portion of said primary fluidized bed is contained within said open-ended cyclone at said open end, forming a secondary fluidized bed;

(d) separating the mixture of solid particles and vapor into separated vapor and separated solid particles containing adsorbed or entrained residue;

(e) settling said separated solids to said secondary fluidized bed contained within said open-ended cyclone;

(f) introducing a gas to strip the residue from the separated solids, forming stripped vapors and stripped solid particles;

(g) passing the separated vapor and stripped vapor downstream of the open-ended cyclone; and (h) fluidizing stripped solid particles away from the open end of said open-ended cyclone and into the primary fluidized bed.

16. The method of claim 15 further comprising operating the open-ended cyclone at a slight positive pressure compared to said disengager, wherein a level of said secondary fluidized bed is below the level of said primary fluidized bed.

17. A method for retrofitting a disengager having a zone adapted to contain fluidized solid particles for separating mixtures of solid particles and vapor and for stripping adsorbed and entrained residue from said solid particles, said method comprising:

(a) positioning in said disengager a substantially can-shaped open-ended cyclone, said open-ended cyclone having an open end projecting downwardly into said zone adapted to contain fluidized solid particles;

(b) placing a means for conveying said mixture of solid particles and vapors in communication with a first inlet of said open-ended cyclone; and (c) placing an exhaust conduit means to provide a gas flow pathway in communication with an outlet of said open-ended cyclone.

18. The method of claim 17 further comprising:

(a) positioning in said disengager a hollow substantially closed cyclone in series with said open-ended cyclone;

(b) placing the exhaust conduit means to provide a gas flow pathway in communication with an inlet of said closed cyclone; and (c) attaching an outlet of said closed cyclone to an outlet conduit means.

19. The method of claim 18 further comprising providing a means for compensating for thermal and vibrational movement between said open-ended cyclone and said closed cyclone; and providing a means for stripper gas from said disengager to enter said closed cyclone.

20. The method of claim 18 further comprising operating the open-ended cyclone at a slight positive pressure compared to said substantially closed cyclone and said disengager.

21. A method for sealing an open-ended cyclone in a fluidized bed of solid particles, said method comprising submerging an open end of said open-ended cyclone into said fluidized bed.

22. The method of claim 21 further comprising attaching a gas/solids conduit means to an inlet of said open-ended cyclone.

23. The method of claim 22 wherein (a) a top surface of said fluidized bed is maintained above the open end of said open-ended cyclone; and (b) a portion of said fluidized bed is contained within said open-ended cyclone at said open end, forming a secondary fluidized bed.

* * * * *